July 6, 1965 H. B. SUTTON 3,193,039
SCOOTER WITH TANDEM TRACTION WHEEL DRIVE
Filed May 31, 1963 2 Sheets-Sheet 1
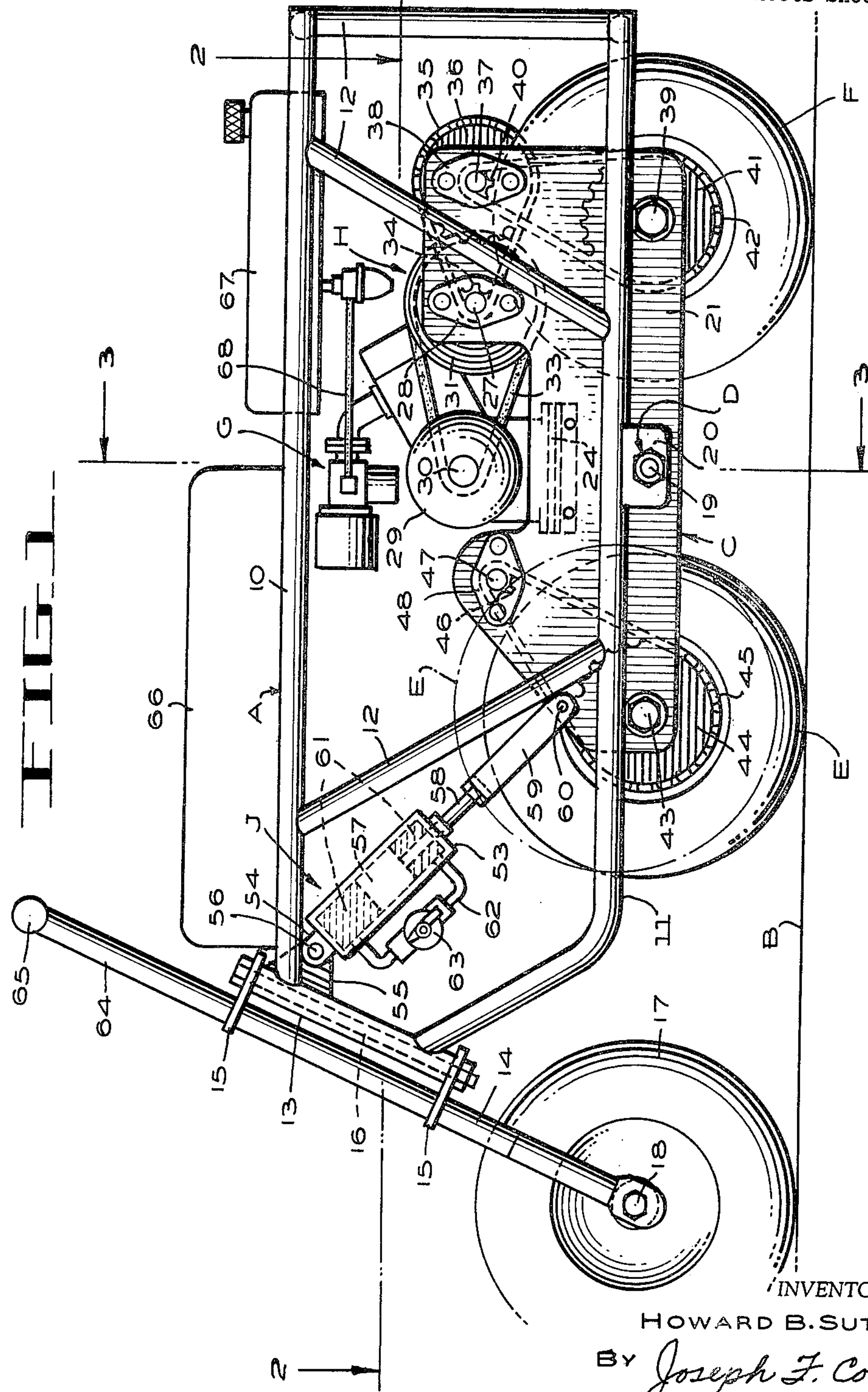
INVENTOR.
HOWARD B. SUTTON
BY Joseph F. Cole
ATTORNEY July 6, 1965 H. B. SUTTON 3,193,039
SCOOTER WITH TANDEM TRACTION WHEEL DRIVE
Filed May 31, 1963
2 Sheets-Sheet 2
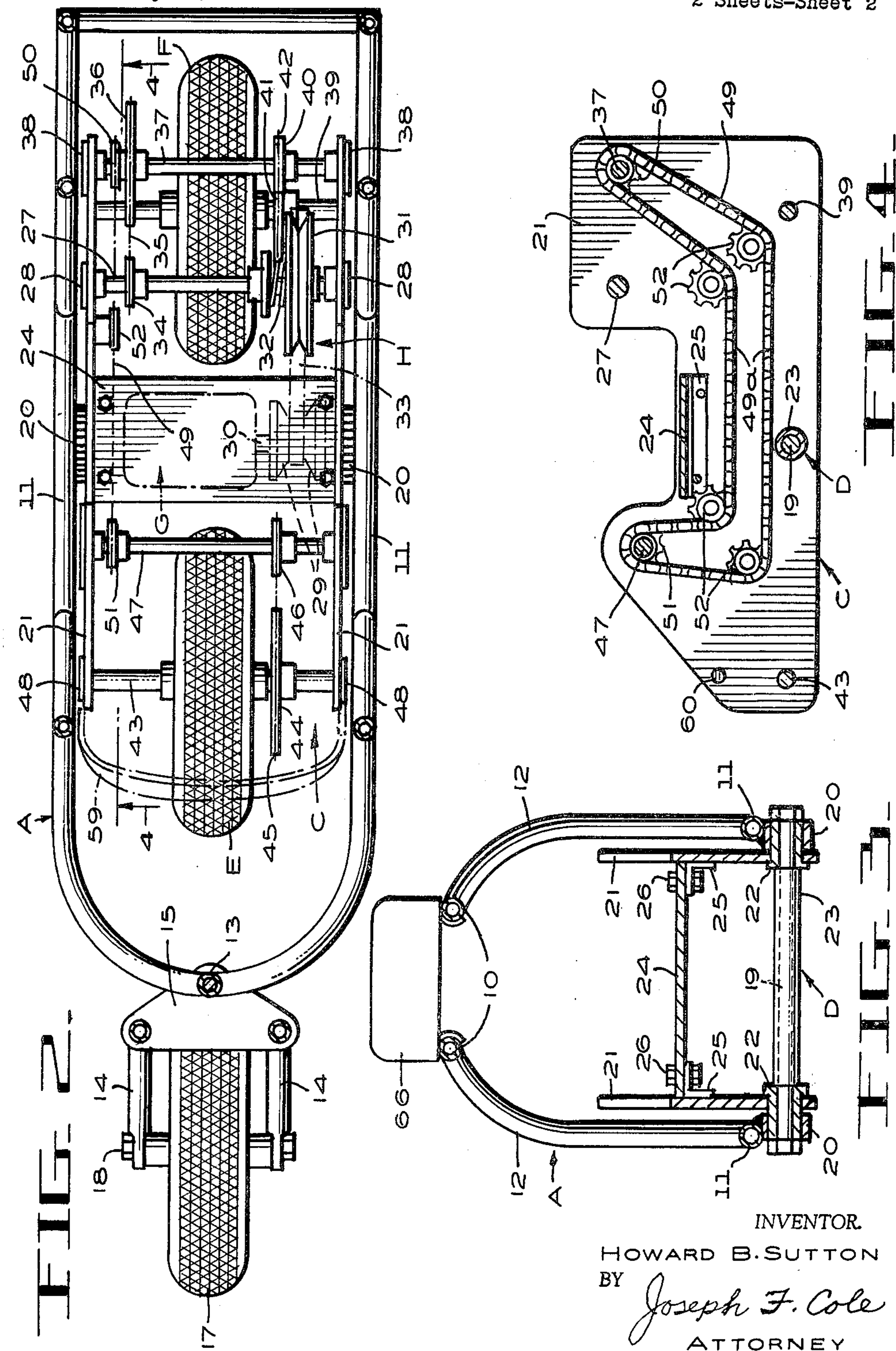

United States Patent Office 3,193,039
Patented July 6, 1965

3,193,039
SCOOTER WITH TANDEM TRACTION WHEEL DRIVE

Howard B. Sutton, 3621 Florence St., Redwood City, Calif.

Filed May 31, 1963, Ser. No. 284,665
3 Claims. (Cl. 180—25)

The present invention relates to a scooter with tandem traction wheel drive. It consists of the combinations, constructions and arrangement of parts, as hereinafter described and claimed.

An object of my invention is to provide a scooter with tandem traction wheel drive, which is designed to afford a high degree of traction, when negotiating rugged and steep terrain; but which may be utilized for riding over roads at relative high speeds, with the scooter being easily steered.

More specifically stated, I propose to provide a scooter having a supporting frame provided with a terrain-engaging steering wheel at the forward end thereof, this supporting frame in turn being provided with a wheel carriage assembly on which front and rear traction wheels are mounted. The wheel carriage assembly is swingably secured to the supporting frame for swinging in either direction about a horizontal axle, whereby both traction wheels may remain in contact with uneven terrain as the scooter is moved thereover. Both of these traction wheels may be driven so that a great deal of traction will result, thus making the scooter applicable for moving over rough terrain. However, the wheel carriage assembly may be tilted about the horizontal axle so that the front traction wheel will clear the ground. At this time, the scooter may be driven at high speeds and may be readily steered.

Another object of my invention is to provide a wheel carriage assembly on which a source of power, for instance an engine, is mounted, together with all of the driving mechanism from the engine to the traction wheels, thus forming a self-contained unit with the ability to pivot about the horizontal axle. Thus all of the mechanism may be installed on the wheel carriage assembly, and then the latter may be coupled to the supporting frame of the scooter by the horizontal axle. Likewise, removal of the horizontal axis will permit the entire wheel carriage assembly to be detached from the supporting frame for repair or storage in a compact space.

Other objects and advantages will appear as the specification proceeds. The novel features of the invention will be pointed out in the appended claims.

*Drawings*

For a better understanding of the invention, reference should be had to the accompanying drawings, forming part of this specification, in which:

FIGURE 1 is a side elevational view of my scooter with tandem traction wheel drive;

FIGURE 2 is a longitudinal sectional view taken along the plane 2—2 of FIGURE 1, the engine being shown by dot-dash lines;

FIGURE 3 is a vertical transverse sectional view taken along the plane 3—3 of FIGURE 1; and FIGURE 4 is a fragmentary longitudinal sectional view taken along the plane 4—4 of FIGURE 2.

While I have shown only the preferred form of my invention, it should be understood that various changes, or modifications, may be made within the scope of the appended claims without departing from the spirit thereof.

*Detailed description*

Referring now to the drawings in detail, I have shown a supporting frame which is designated generally at A in FIGURES 1 to 3, inclusive. This frame defines side frame members having upper horizontal tubes 10, lower horizontal tubes 11, the tubes 10 and 11 being joined together by suitable bracing strut tubes 12. Moreover, the forward ends of the tubes 10 and 11 are secured to an upward-extending front tube 13 that provides a journal support for a steering fork 14. The latter has brackets 15 fixed thereto and through which a bolt 16 extends, this bolt forming a journal on which the front tube 13 is mounted.

At the lower end of the fork 14 there is mounted a terrain-engaging steering wheel 17 that is rotatably supported on a bolt 18, with this wheel contacting with the terrain B.

It will be noted that a wheel carriage assembly C is pivotally secured to the supporting frame A for swinging in either direction about a substantially horizontal transverse axle D. The latter includes a bolt 19 passing through lugs 20 that are fixed to and extend below the lower tubes 11 of the supporting frame. As clearly disclosed in the drawings, the wheel carriage assembly C further defines a pair of side plates 21, one being disposed adjacent to each of the side frame members of the supporting frame A. In FIGURE 3, I show bearings 22 as extending through the lugs 20 and the side plates 21, which a sleeve 23 surrounding the bolt 19 and extending between the bearings 22 and serving as a spacer. The axle D actually includes both the pivot bolt 19 and the spacer sleeve 23.

The wheel carriage assembly C has front and rear traction wheels E and F, respectively, rotatably mounted thereon and disposed longitudinally of this carriage assembly for engaging with the terrain B (see FIGURE 1). It is important to note the wheel carriage assembly C and the traction wheels E and F are swingable about the transverse axle D, whereby both traction wheels may maintain contact with uneven terrain as the scooter is moved thereover. As the specification proceeds, it will be made clear that power means are connected to both traction wheels and operable to drive both of them simultaneously.

With particular reference to FIGURES 1 and 2, it will be seen that the terrain-engaging steering wheel 17 and the two tractions wheels E and F are arranged in longitudinal alignment with one another, and these three wheels are substantially equally spaced from one another longitudinally of the scooter.

The power means includes an engine G mounted on an engine-supporting plate 24 that extends between the spaced side plates 21 of the wheel carriage assembly C and secured thereto. For this purpose, angle bars 25, or the like, may be fixed to the inner surfaces of the side plates 21 and bolts 26 utilized for anchoring the plate 24 to these angle bars (see FIGURE 3).

With particular reference to FIGURES 1 and 2, it will be noted that the engine G is mounted in a position above the axle D, with the weight of the engine being distributed in substantially balanced relation with respect to this axle. Moreover, the axle D about which the wheel carriage assembly C is swingable is disposed substantially midway between the front and rear traction wheels E and F, respectively, and the axle D is disposed below the supporting frame A in a position to provide a low pivot about which the wheel carriage assembly is swingable.

As to the details of the mechanism for connecting the engine G to the traction wheels E and F, a countershaft 27 is mounted to extend horizontally between the side plates 21, with this shaft being supported for rotation in bearings 28 fixed to these side plates (see FIGURES 1 and 2). A variable speed drive H is provided between the engine G and the countershaft 27. This drive defines a double cone pulley 29 that is turned by the engine shaft 30 and a double cone pulley 31 fixed to the countershaft 27, the latter having a coil spring 32 extending therearound and arranged to yieldingly urge the two cone plates of this double cone pulley toward one another in a conventional manner. An endless belt 33 is trained around the pulleys 29 and 31 so as to transmit rotary motion from the former to the latter.

In FIGURES 1 and 2, a small sprocket 34 is disclosed as being secured to the countershaft 27, and this sprocket is connected by a chain 35 to a larger sprocket 36 fixed to a horizontal rear drive shaft 37. The latter extends transversely between the side plates 21 and is journalled for rotation in bearing 38 secured to these side plates.

With respect to the rear traction wheel F, it is mounted on a rear wheel shaft 39 which is supported by the side plates 21. A small sprocket 40 is fastened to the rear drive shaft 37, while a larger sprocket 41 is fixed to the rear wheel shaft 39. A chain 42 is trained over the sprockets 40 and 41 so that rotation of the drive shaft 37 will impart turning movement to the rear traction wheel F.

The front traction wheel E is mounted on a front wheel shaft 43 that is supported by the side plates 21, and this shaft has a large sprocket 44 thereon, which is connected by a chain 45 to a smaller sprocket 46 fixed to a front drive shaft 47. The latter extends horizontally between the side plates 21 and is journalled for rotation in bearings 48 carried by these side plates. Thus rotation of the front drive shaft 47 will turn the front traction wheel E.

For the purpose of rotating the front drive shaft 47, a motion-transfer chain 49 is provided (see FIGURE 4). This chain is trained around small sprockets 50 and 51 fixed to the drive shafts 37 and 47, respectively. The reaches 49a of this chain pass beneath the engine-supporting plate 24 and are guided around idler sprockets 52 in the manner shown in FIGURE 4. Thus the engine G imparts turning movement to both of the traction wheels E and F so as to advance the scooter over the terrain B.

When riding the scooter at high speeds, it is advisable to raise the front traction wheel E out of contact with the terrain, as indicated by dot-dash lines in FIGURE 1, and thus make steering of the scooter easier, while the terrain-engaging steering wheel 17 and the rear traction wheel F remain in engagement with the terrain. For this purpose, a hydraulic cylinder or snubber J is provided (see FIGURE 1). This snubber is provided between the supporting frame A and the wheel carriage assembly C, and is normally operable to yieldably urge the traction wheels E and F into engagement with the terrain B, even though the latter may be uneven.

However, the snubber J is operable to retain the wheel carriage assembly C into a predetermined tilted position into which it has been swung about the axle D, wherein the front traction wheel E will clear the terrain B. This snubber has a cylinder 53 that is pivotally secured by a clevis 54 formed on one end of the cylinder to a bracket 55 fixed to the supporting frame A, for example, the front journal tube 13. As shown in FIGURE 1, a pivot pin 56 extends through the clevis 54 and the bracket 55 so that the snubber J may swing about this pin.

A piston 57 is slidably mounted in the cylinder 53 and has a piston rod 58 fixed thereto so as to extend from the cylinder. The outer end of this piston rod is secured to a yoke 59 that extends transversely relative to the wheel carriage assembly C (see FIGURE 2) and having its opposite ends swingably anchored by journal pins 60 to the forward parts of the side plates 21 (see FIGURE 1).

It will be noted that hydraulic fluid 61 is contained in the cylinder at opposite ends of the piston 57. A by-pass pipe 62 communicates with opposite ends of the cylinder 53, whereby the hydraulic fluid 61 may surge from one end of the cylinder 53 to the other end thereof. Accordingly, the snubber J is operable to yieldingly urge the wheel carriage assembly C into a position wherein the traction wheels E and F will contact with the terrain B.

The snubber includes manually adjustable means for regulating the yielding movement of the wheel carriage assembly C, and this is provided by a valve 63 mounted in the by-pass pipe 62. When this valve is fully opened, the hydraulic fluid 61 may surge back and forth through this by-pass pipe; and as this valve is moved toward closed position, the flow of the hydraulic fluid will be impeded.

It will be apparent that the front traction wheel E may be moved into a position to clear the terrain B by tilting the wheel carriage assembly C. At this time, the regulating valve 63 may be closed and this will retain the front traction wheel in raised position, while the rear traction wheel F and the steering terrain-engaging wheel 17 still remain in contact with the terrain.

Particular attention is called to the fact that the entire wheel carriage assembly C may be withdrawn as a unit from the supporting frame A by merely removing the transverse journal shaft D from the side frame members of the supporting frame.

From the foregoing description, it will be obvious that I have provided a scooter in which the three wheels 17, E and F are in direct line, with the traction wheels E and F as well as the engine G and all driving chains and sprockets forming a self-contained unit, with the ability to pivot about the axle D in a vertical arc.

The two driven traction wheels E and F of the scooter do not sense the movement of the front steering wheel 17 or the supporting frame A, because the wheel carriage assembly C may pivot about the horizontal axle D.

When passing over an object in the roadway, the steering wheel 17, fork 14 and the supporting frame A lift, leaving the two traction wheels E and F on the surface of the terrain B to generate traction. When the front traction wheel E reaches the object, due to the direction of the wheel rotation, it has the ability to lift and the rear traction wheel F will push the front traction wheel E toward the face of the object, forcing the traction wheel E to have traction even though the latter is moving in a vertical direction.

As the rear traction wheel F reaches the object, the front traction wheel E is now in a position to pull the rear wheel F toward the face of the object, forcing it to maintain traction even though it is moving in a vertical direction.

The same explanation is true when the scooter is ridden over a ditch or hole, since the traction wheels E and F have the ability to follow the uneven terrain.

Due to the fact that the wheel carriage assembly C is mounted for swinging about the axle D in either direction, the scooter has 100% more traction than a two-wheel rigid scooter. Both tractions wheels are in constant contact with the surface over which the scooter is being ridden.

When either of the driven traction wheels is forced to lift, greater traction is generated on the other driven wheel. The scooter will perform much better than any two-wheel unit where traction is a factor.

When riding on a side hill with the scooter in upright position, most two-wheel scooters have a tendency to slip from under the rider. My three-wheel scooter reduces this tendency to a much lesser degree. Also, when riding down grade in loose soil, gravel, or under slippery conditions, my three-wheel scooter has much better braking ability.

It may also be pointed out that any scooter being ridden upgrade under full power has a tendency for the rear of the scooter to move left or right and it is hard to balance. The three-wheel scooter lessens this action to a great degree. As my scooter moves over terrain, it smooths the ride to a great degree, since neither of the driven traction wheels tends to bounce when passing over an object.

As previously pointed out, the rider can control the movement of the wheel carriage assembly C about the transverse axle D by regulating the valve 63, and the rider can create the movement desired of the front traction wheel E.

The scooter herein shown has a great advantage when it is necessary to store the unit in a small area for transport, or when repair work is to be accomplished. By removing the bolt 16 from the fork 14, the latter and the steering wheel 17 may be removed from the supporting frame A. By loosening and removing the axle D, the wheel carriage assembly C may be detached from the supporting frame A. This will result in breaking down the scooter into three major units or sub-assemblies. The same is true when repair is necessary to the wheel carriage assembly C. By pulling the bolt 19 all mechanical portions of the scooter are readily accessible. The entire scooter has been designed so as to require a very minor amount of hand tools, either for assembly or repair.

In FIGURE 1, I have shown the steering fork 14 as having a post 64 at its upper end, this post being provided with a conventional handle bar 65, whereby a rider occupying a seat 66 on the supporting frame A may steer the scooter. Of course, the usual controls for the engine G and the brake handles for the scooter may be mounted on the handle bar 65; and since this is the usual arrangement, no details are considered necessary. The valve 63 would be arranged within reach of the rider. Moreover, a gas tank 67 may be supported by the upper tubes 10 and connected to the engine G by a flexible conduit 68 so that the wheel carriage frame C with its engine may swing about the shaft D. However, I do not wish to be limited in this respect.

The wheel shafts 39 and 43 may be mounted stationary relative to the wheel carriage assembly C, if desired; in this event, the traction wheels F and E would be arranged for rotation on the shafts 39 and 43, respectively, and the larger sprockets 41 and 44 would be fixed to the wheels F and E, respectively.

I claim:

1. In a scooter with tandem traction wheel drive:
(a) a supporting frame provided with a terrain-engaging steering wheel;
(b) the supporting frame defining a pair of laterally-spaced side frame members;
(c) a wheel carriage assembly having a pair of laterally-spaced parallel and upright plates, each being disposed adjacent to one of the side frame members in substantially parallel relation therewith;
(d) a substantially horizontal transverse journal axle secured to the side frame members to extend through the side plates and about which the wheel carriage assembly may swing in either direction;
(e) the wheel carriage assembly having front and rear traction wheels mounted on shafts that are supported by the side plates and arranged therebetween for engaging with the terrain;
(f) an engine-supporting plate extending between the spaced side plates of the wheel carriage assembly and being secured thereto;
(g) an engine mounted on said supporting plate and a variable speed drive operable by the engine, said drive being disposed between the spaced side plates and supported on a shaft having its ends journalled in bearings fixed to the side plates, said drive being operatively connected by sprocket-chain assemblies to both traction wheels to drive the latter simultaneously, the sprockets being mounted on shafts, each of the latter being supported in bearings fixed to the side plates;
(h) the side plates, traction wheels, supporting plate, engine and variable speed drive all being withdrawable as a unit from the supporting frame, when the transverse journal axle is removed from the side frame members of the supporting frame, without dismantling said variable speed drive and sprocket-chain assemblies.

2. In a scooter with tandem traction wheel drive:
(a) a supporting frame provided with a terrain-engaging steering wheel;
(b) the supporting frame defining a pair of laterally-spaced side frame members;
(c) a wheel carriage assembly having a pair of laterally-spaced side plates, each being disposed adjacent to one of the side frame members;
(d) a substantially horizontal transverse journal axle secured to the side frame members to extend through the side plates and about which the wheel carriage assembly may swing in either direction;
(e) the wheel carriage assembly having front and rear traction wheels rotatably mounted on the side plates and arranged therebetween for engaging with the terrain;
(f) an engine-supporting plate extending between the spaced side plates of the wheel carriage assembly and being secured thereto;
(g) an engine mounted on said supporting plate and being operatively connected to both traction wheels to drive the latter simultaneously;
(h) the side plates, traction wheels, supporting plates and engine being withdrawable as a unit from the supporting frame, when the transverse journal axle is removed from the side frame members of the supporting frame;
(i) a yoke extending transversely relative to the wheel carriage assembly and having its opposite ends swingably anchored to the side plates;
(j) a snubber provided between the supporting frame and the yoke, and being operable to yieldingly urge the wheel carriage assembly into a position wherein the traction wheels will contact with the terrain;
(k) the snubber including manually adjustable means for regulating the yielding movement of the wheel carriage assembly.

3. The scooter with tandem traction wheel drive, as set forth in claim 2;
(l) and in which said manually adjustable means is operable to retain the wheel carriage assembly in a tilted position wherein one of the traction wheels clears the terrain, whereby steering of the scooter will be facilitated while the other traction wheel remains in contact with the terrain.

References Cited by the Examiner

UNITED STATES PATENTS

| | | | |
|---|---|---|---|
| 1,484,193 | 2/24 | Scott | 188—97 X |
| 2,391,948 | 1/46 | Couse | 280—104.5 |
| 2,589,793 | 3/52 | Franks | 180—33 X |
| 2,953,390 | 9/60 | Hogstrom | 280—104.5 |
| 2,999,555 | 9/61 | Stroud et al. | 180—19 |
| 3,101,805 | 8/63 | Tritle | 180—33 X |
| 3,103,368 | 9/63 | Erickson | 280—43.23 X |
| 3,117,800 | 1/64 | Magnuson | 280—124 |

FOREIGN PATENTS

| | | |
|---|---|---|
| 278,648 | 10/30 | Italy. |

A. HARRY LEVY, *Primary Examiner.*

KENNETH H. BETTS, *Examiner.*